United States Patent [19]
Hiddessen

[11] Patent Number: 5,941,276
[45] Date of Patent: Aug. 24, 1999

[54] STARTING VALVE

[75] Inventor: Ralf Hiddessen, Lehrte/Arpke, Germany

[73] Assignee: Press Controls AG Rumlang, Rumlang, Switzerland

[21] Appl. No.: 08/979,122

[22] Filed: Nov. 26, 1997

[30] Foreign Application Priority Data

Dec. 2, 1996 [DE] Germany .......................... 196 49 920

[51] Int. Cl.⁶ .................................................. F16K 17/04
[52] U.S. Cl. .......................................... 137/494; 137/509
[58] Field of Search ..................... 137/494, 509

[56] References Cited

U.S. PATENT DOCUMENTS

| 4,192,346 | 3/1980 | Iizumi | 137/509 X |
| 4,652,216 | 3/1987 | Eslinger et al. | 137/494 X |
| 5,052,433 | 10/1991 | Levenez | 137/509 X |

FOREIGN PATENT DOCUMENTS 0 328 472B1   4/1993   Germany .

*Primary Examiner*—Stephen M. Hepperle
*Attorney, Agent, or Firm*—Reising, Ethington, Barnes, Kisselle, Learman & McCulloch, P.C.

[57] ABSTRACT

The invention relates to a starting valve for progressive build-up of pressure in an installation through which pressure medium flows, in which a piston is movable to and fro in a housing between a closed and an open position. Means are also provided for maintaining a low flow of pressure medium—while the piston is in the closed position—between a region with high pressure on one side of the valve seat and a region with pressure building up on the other side of the valve seat. The piston has action surfaces which are exposed to the high pressure or to the pressure building up end which generate force components which push the piston into its open or closed position. The piston moving into the open position when the difference between the high pressure and the pressure building up falls below a threshold value. In the housing one region with high pressure and two regions with pressure building up are provided, the latter being connected to one another by way of a channel disposed in the piston.

18 Claims, 5 Drawing Sheets

STARTING VALVE

The invention relates to a starting valve for progressive build-up of pressure in an installation through which pressure medium flows.

BACKGROUND OF THE INVENTION

When a compressed air installation which has previously been switched off and vented is switched on again, dangerous and damaging pressure surges can occur which lead to damage of cylinders arranged downstream. In order to prevent this, so-called starting valves for progressive build-up of pressure have been developed.

A prior art starting valve according to is known from EP-B-O 328 472. comprises:
 a housing with a first and a second opening,
 a channel connecting the two openings.
 a piston which is movable to and fro in the housing between a closed and an open position, which in the closed position co-operates with a valve seat and thereby closes the channel,
 means for maintaining a low flow of pressure medium—while the piston is in the closed position—between a region with high pressure on one side of the valve seat and a region with pressure building up on the other side of the valve seat,
 and a spring element which pushes the piston into the closed position,
 wherein the piston has action surfaces which are exposed to the high pressure or to the pressure building up and which generate force components which push the piston into its open or closed position when the difference between the high pressure and the pressure building up falls below a threshold value.

In this known starting valve the two action surfaces are provided in the region of the valve seat on the piston, one action surface being disposed on one side of the valve seat and the other action surface on the other side of the valve seat. The action surface to which the high pressure is applied pushes the piston into its closed position, whilst the action surface to which the pressure building up is applied pushes the piston into the open position. By way of a bypass duct disposed in the piston the high pressure gradually proceeds to the other side of the valve seat where it acts in combination with the second action surface in the sense of opening the piston. Since the second action surface is greater in terms of surface area than the first action surface, after a certain equalisation of pressure the closing force emanating from the first action surface and the spring element is overcome so that the piston moves slowly into the open position.

The end of the piston lying opposite the valve seat is located beyond a seal in ambient air and is guided through the bore in a stopper which closes the device. The diameter of the piston in the region of the seal is smaller in this case than the diameter of the piston in the region of the valve seat.

In many cases it is desirable to provide adjusting means which co-operate with the means for maintaining a low flow of pressure medium in order to alter the flow rate of the low flow of pressure medium.

In the known starting valve these adjusting means are formed by an adjusting screw with which the cross-section of the bypass duct disposed in the piston can be altered. This adjusting screw is disposed in the piston and is adjustable in the longitudinal direction thereof. However, when this adjusting screw is moved, the piston itself must be locked since otherwise it would also turn. An adjustment therefore requires additional costs. In addition the cost of manufacture of this known starting valve is relatively high. Thus the known starting valve only allows one direction of installation into an existing pneumatic plant, since the high pressure may only be applied to the opening which is in communication with the action surface which pushes the piston into the closed position. For the second installation variant, therefore, a starting valve is necessary which not only has another piston but also has a differently constructed housing.

The object of the invention, therefore, is to provide a starting valve which uses a new principle of action facilitating simpler construction or simpler manipulation.

SUMMARY OF THE INVENTION

According to the invention one region with high pressure and two regions with pressure building up are provided in the housing, the two regions with pressure building up being connected to one another by way of a channel disposed in the piston.

THE DRAWINGS

Further embodiments and advantages of the invention are explained in greater detail with reference to the following description of two embodiments and the drawings, in which.

DETAILED DESCRIPTION

Figure 1:
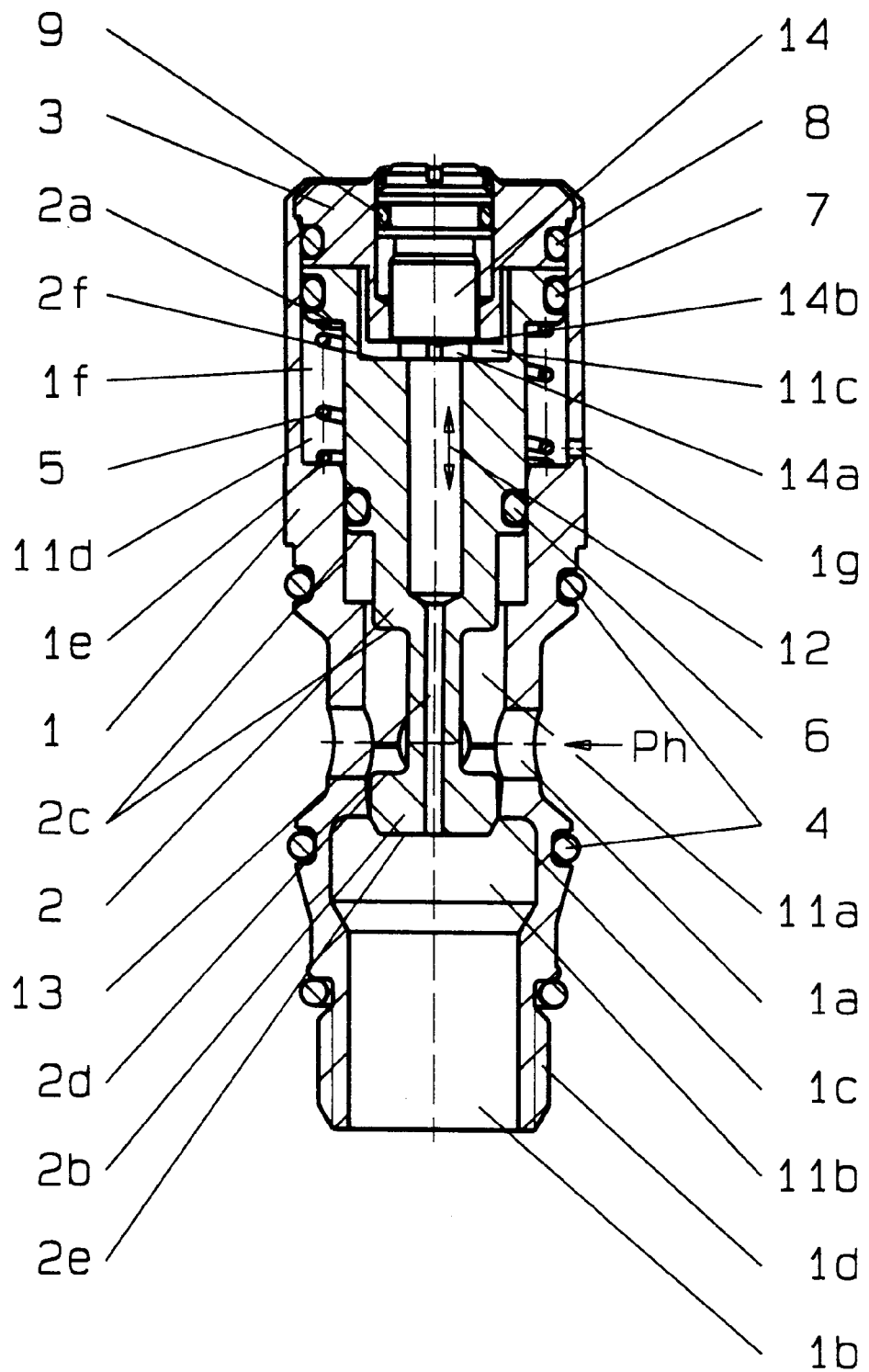
FIG. 1 shows a sectional representation of a starting valve according to a first embodiment in the closed position.
Figure 2:
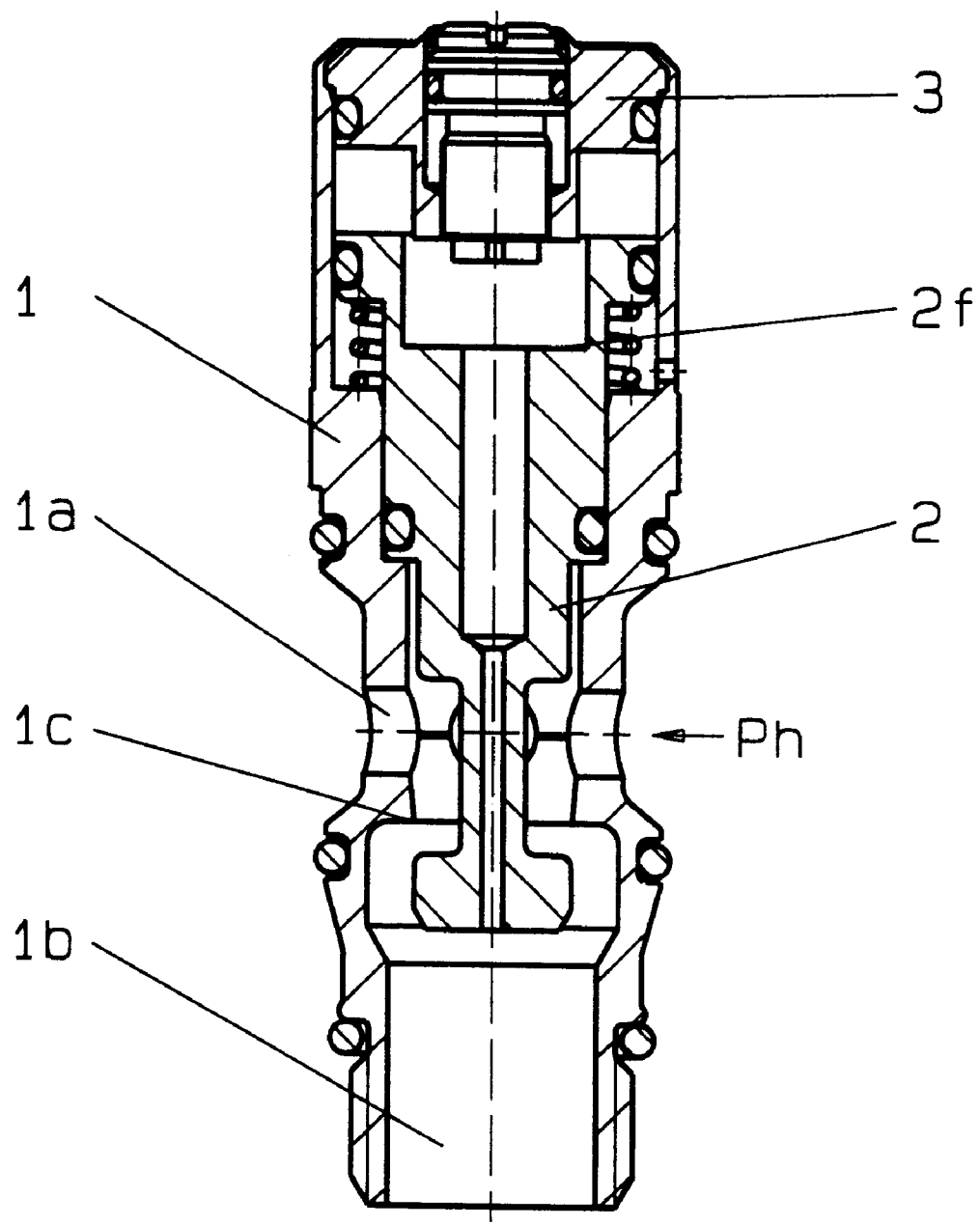
FIG. 2 shows a sectional representation of the embodiment according to FIG. 1 in the open position.

The first embodiment shown in FIGS. 1 and 2 consists essentially of a housing 1 with a first opening 1a and a second opening 1b as well as a piston 2 which is movable to and fro between a closed and an open position, co-operates with a valve seat 1c in the closed position according to FIG. 1, and closes a channel connecting the two openings 1a.

The housing 1 is formed by a hollow screw which has a thread, in this case en external thread 1d, on one end. The second opening 1b is provided in the region of this threaded end of the housing, whilst the opposite end is closed off with a closure element 3. In the illustrated embodiment the first opening 1a is formed by four lateral bores distributed regularly over the periphery of the housing, wherein in the region of these bores a module is provided which is releasably fixed on the housing and rotatable about itself, is generally known and is not shown in greeter detail for reasons of clarity. This rotatable module is connected in a pressure-tight manner by way of seals 4.

Furthermore a spring element 5 which pushes the piston 2 into its closed position is provided in the housing 1. This spring element Is supported on the one hand on an annular shoulder 1e and on the other hand on an end 2a of the piston 2 which is widened like a flange. The spring element 5 is accommodated in a chamber If between the housing 1 and the piston 2. In order to seal off the chamber so as to be pressure-tight against the other regions of the housing, a first and second seal 6, 7 are provided between the piston and the housing. The chamber 1f communicates by way of an air vent 1g with the ambient air, so that ambient pressure prevails in it.

Also, by way of an Inlaid seal 8 the closure element 3 ensures a pressure-tight closure of the housing 1.

The illustrated starting valve is coupled in the region of its first opening 1a by way of the rotatable module (not shown in greeter detail) to a first component of an installation through which pressure medium flows and with its second opening 1b to a second component of this installation.

Figure 5A:
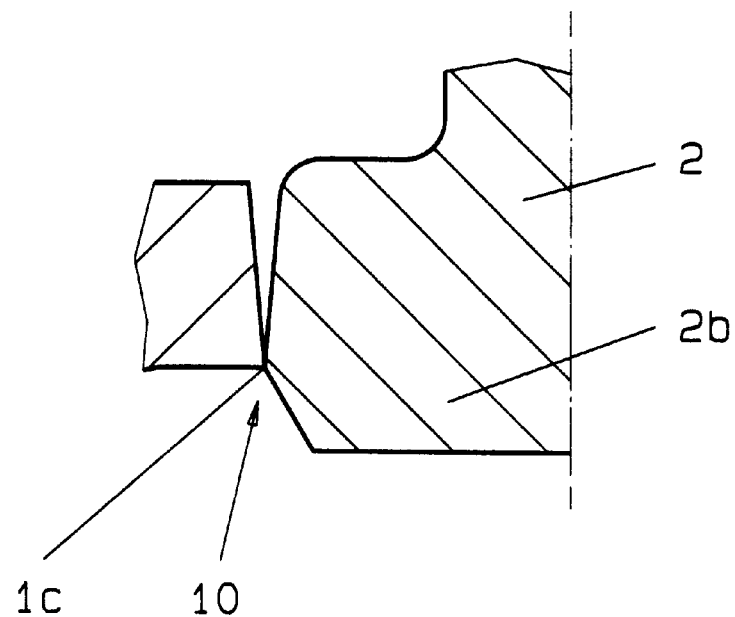

The starting valve also has means for maintaining a low flow of pressure medium—when the piston is in the closed position —between a region with high pressure on one side of the valve seat 1c and a region with pressure building up on the other side of the valve seat. FIG. 5a shows this region in an enlarged representation. It shows the piston 2 in its closed position on the valve seat 1c. The means for maintaining a low flow of pressure medium are formed by an end region 2b of the piston 2 and the valve seat 1c, an annular throttle opening 10 being formed between the end region 2b of the piston and the valve seat 1c.

In the illustrated embodiment according to FIGS. 1 and 2 the high pressure is applied in the region of the First opening la and is characterised by ph. In this initial situation the starting valve can be divided into four regions 11a, 11b, 11c and 11d.

The first region lie is provided in the region of the first opening 1a and is formed between the inner wall of the housing 1 and the outer wall of the piston 2. The first seal 6 is provided at one point of contact between the housing and the piston and the valve seat 1c is located at the other point. Thus the high pressure ph is applied in the first region 11a by way of the first opening 1a.

In the first region 11a the piston 2 has action surfaces which extend transversely with respect to its direction of displacement (see double arrow 12). Thus in the illustrated embodiment a first action surface 2c of annular and stepped construction end an annular second action surface 2d are provided. Due to the high pressure applied these two action surfaces generate force components which push the piston in opposing directions. Since the first action surface 2c is larger than the second action surface 2d, a total action surface or a total force component is produced which keeps the piston in the closed position illustrated in FIG. 1.

By way of the throttle opening 10 the high pressure ph proceeds gradually into the second region 11b which is defined by the inner wall of the housing 1 in the region of the second opening 1b and the front end 2b of the piston 2 in the region of the valve seat 1c. Thus in the second region 11b the pressure $p_a$ building up prevails.

In the second region 11b the piston 2 has a third action surface 2e which is formed by the end face of the end 2b of the piston 2 and due to the applied pressure produces a force component in the direction of the closed position.

The piston 2 has a central channel 13 which runs from one end 2b to the other end 2a and connects the second region 11b to the third region 11c. The third region 11c is defined on the one hand by the end 2a of the piston 2 remote from the valve seat, an inner wall of the housing 1 and by the closure element 3.

The third seal 8 between the closure element 3 and the housing 1 as well as the second seal 7 between the end 2a of the piston 2 and the housing ensure the third region 11c which is closed off so as to be pressure-tight and communicates by way of the channel 13 with the second region 11b. Thus the pressure building up $p_a$ also prevails in the third region 11c. The entire end face of the piston 2 at its end 2a forms an action surface 2f in the third region 11c which due to the pressure building up generates a force component which pushes the piston 2 into the open position according to FIG. 2. The diameter of the piston in the region of its second seal 7 is substantially greeter than the diameter of the piston in the region of the valve seat 1c.

Finally, the chamber if forms the fourth region 11d which is separated from the other regions by the first and second seals 6, 7 and is exposed to the ambient pressure by way of the air vent 1g. The spring element 5 disposed in the chamber if is pretensioned in such a way that it pushes the piston 2 into its closed position shown in FIG. 1. However, the spring force is insignificant by comparison with the forces applied by the pressures.

Without taking into account the frictional forces, because of the pressures applied to the action surfaces the following force components are produced:

in the direction of closure: $A_{2c}*p_h+A_{2e}*P_a$
in the direction of opening: $A_{2d}*p_h+A_{2r}*P_a$.

In this case the high pressure is denoted by $p_h$ the pressure building up by $p_a$ and the respective action surface by A.

The piston moves from the closed position shown in FIG. 1 into the open position shown in FIG. 2 when the force components in the direction of opening exceed the force components in the direction of closure. This is the case when the difference between the high pressure and the pressure building up falls below a threshold value. According to the equations above the piston moves into the open position or is located in the open position when $$p_a > p_h \frac{A_{2c} - A_{2d}}{A_{2f} - A_{2o}}$$

is met.

The speed of equalisation of pressure depends upon the size of the throttle opening. In the illustrated embodiment, therefore, adjusting means are provided which co-operate with the means for altering the flow rate of the low flow of pressure medium. These adjusting means are preferably formed by the adjusting screw 14 which is guided by a thread in the stopper 3. It is adjusted from the exterior for example by a screwdriver or another suitable tool. The adjusting screw 4 has an end 14a which protrudes into the housing, in this case in particular into the third region 11c, and in the closed position comes into contact with the front face of the end 2a of the piston, thereby simultaneously forming a stop for the piston in the closed position.

A seal 9 is provided between the adjusting screw 14 and the stopper 3. Since the adjusting screw 14 comes into contact with the piston 2 precisely in the region of the channel 13, the adjusting screw 14 has transverse slots 14b in this region so that the pressure medium can flow from the channel 13 into the third region 11c.

The further the adjusting screw 14 is turned into the housing. The further the piston 2 is displaced in the direction of its open position. Due to a special construction of the end 2b of the piston 2 the size of the throttle opening 10 can be altered thereby.

Figure 5B:
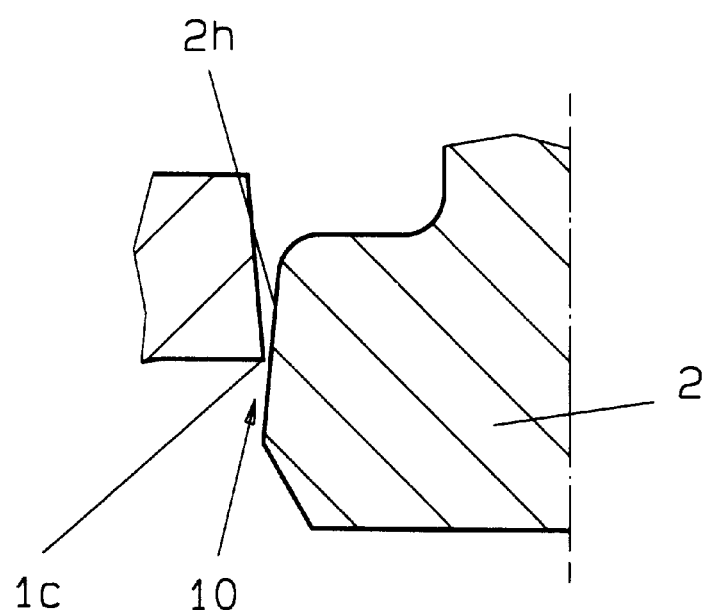

For a more detailed explanation reference is made in this connection to FIGS. 5a, 5b, which show the piston in two different closed positions. The piston 2 has a surface 2h which tapers in diameter in the region of the valve seat 1c. Depending upon the adjustment of the adjusting screw 14 the distance between the valve seat and piston 2 or the throttle opening 10 is smaller (FIG. 5a) or greeter (FIG. 5b).

Naturally, within the scope of the invention other means are also conceivable in order to maintain a low flow of pressure medium. Accordingly other adjusting means could also be provided. However, the adjusting means illustrated here are particularly simple to manipulate since it is merely necessary to apply a suitable tool to the adjusting screw 14 in order to achieve the desired alteration directly by turning. Since the adjusting screw is not retained with a thread in the piston itself. The letter does not have to be secured against turning.

The adjusting means also have the great advantage that the stop for the piston 2 can be displaced by adjustment of the adjusting screw 14 until the piston is located in the open position according FIG. 2. In some circumstances such a procedure is desirable in the installation of a plant and monitoring thereof in many situations.

Figure 3:
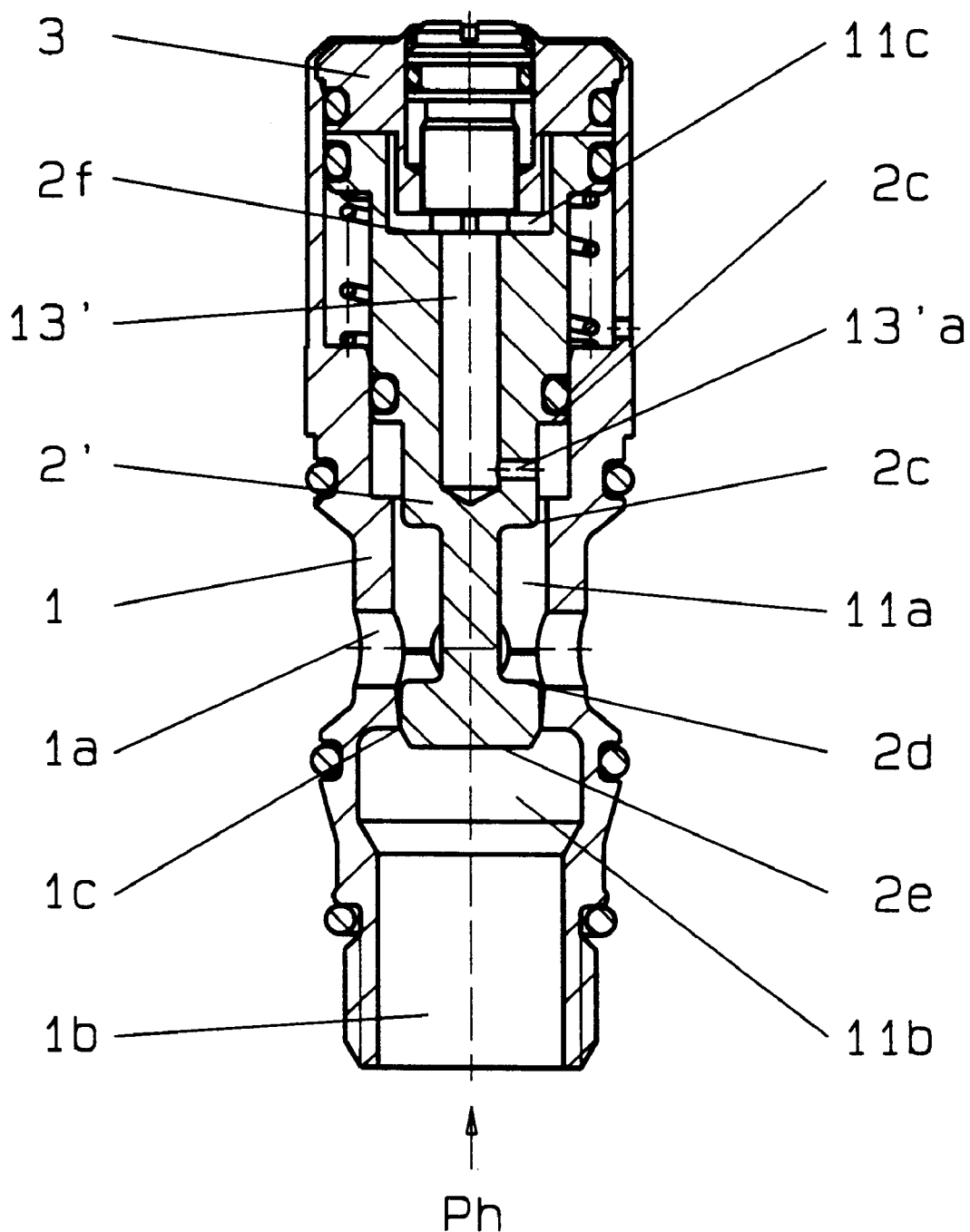
FIG. 3 shows a sectional representation of a starting valve according to a second embodiment in the closed position.
Figure 4:
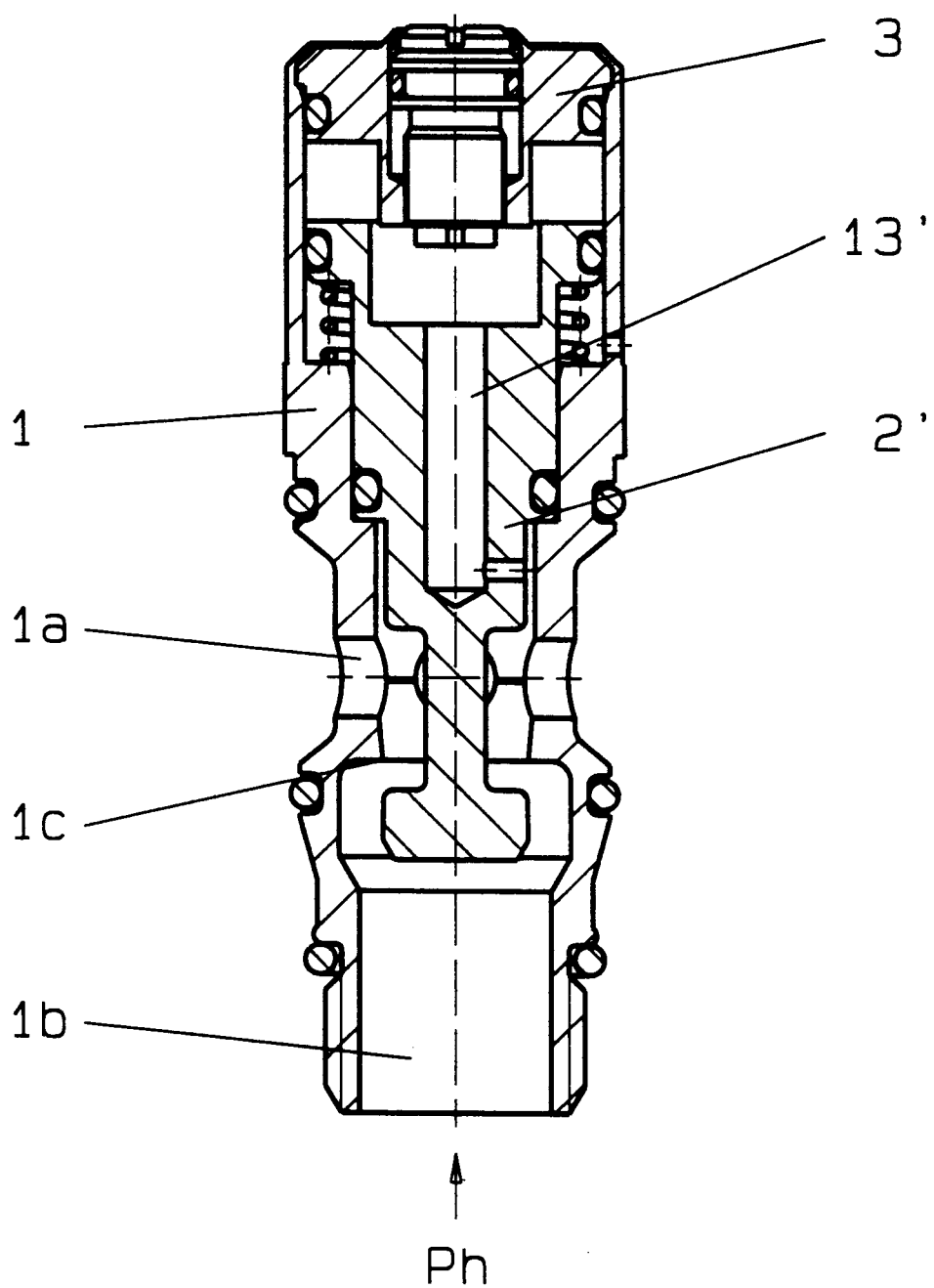
FIG. 4 shows a sectional representation of the embodiment according to FIG. 3 in the open position and FIGS. 5a and 5b show details of the piston in the region of the valve seat in two different positions.

FIGS. 3 and 4 show a second embodiment according to the invention in the closed or open position. Here the high pressure $p_h$ is applied in the region of the second opening 1b. Thus the pressure medium flows from the region 11b into the region 11a beyond the valve seat 1c. Thus the pressure building up $p_a$ prevails in the region 11a.

Due to these other pressure conditions, it is necessary to use a differently constructed piston 2' in which the inner channel 13' does indeed open into the chamber 11c as previously at the end remote from the valve seat 1c, but the channel does not terminate in the region 11b but in the region 11a by way of a transverse bore 13'a. Thus the region 11a with the pressure building up communicates by way of the channel 13' with the region 11c which is consequently also exposed to the pressure $p_a$ building up.

If the insignificant spring force and the frictional forces are again ignored, the pressure building up $p_a$ must satisfy the following equation $$p_a > \frac{p_h * A_{2c}}{A_{2d} + A_{2f} - A_{2c}}$$

so that the piston 2' is located in the open position.

The first embodiment according to FIGS. 1 and 2 differs from the second embodiment according to FIGS. 3 and 4 merely by the channel constructed in the piston. The external shape of the piston as well as the housing, closure element and adjusting means correspond. In this way the work of producing these starting valves for the two different installation possibilities is simplified.

I claim:

1. In a starting valve for progressive build-up of pressure in an installation through which pressure medium flows, said valve comprising:
    a) a housing having a first opening and a second opening,
    b) a channel connecting said first and second openings,
    c) a piston movable to and fro in the housing between a closed position and an open position, said piston when in the closed position seating on a valve seat virtually closing the channel,
    d) means for maintaining a low flow of pressure medium while the piston is in the closed position between a region with high pressure on one side of the valve seat and a region with pressure building up on the opposite side of the valve seat,
    e) and a spring element urging the piston into the closed position,
    f) said piston having action surfaces exposed to the pressures for generating force components which push the piston into its open or closed position, the piston moving into the open position when the difference between the high pressure and the pressure building up falls below a threshold value,
    the improvement wherein
    g) one region with high pressure and two regions with pressure building up are provided in the housing, the two regions with pressure building up being connected to one another by a channel in the piston, and
    h) the action surface which generates a force component which pushes the piston into the open position is at that end of the piston remote from the valve seat.

2. A starting valve according to claim 1 wherein the piston has at least two action surfaces which generate on the piston force components which push the piston into its closed position.

3. A starting valve according to claim 2 wherein one of the two action surfaces pushing the piston into the closed position is exposed to the high pressure and the other to the pressure building up.

4. A starting valve according to claim 1 wherein the action surface pushing the piston into the open position is exposed to the pressure building up.

5. A starting valve according to claim 3 wherein that action surface which is exposed to the pressure building up and generates a force component which pushes the piston into the open position is at that end of the piston remote from the valve seat.

6. A starting valve according to claim 1 wherein one end of said channel opens at that end of the piston remote from the valve seat and the other end of the channel opens either at the other end of the piston lying beyond the valve seat or in a central region of the piston.

7. A starting valve according to claim 1 wherein the housing is constructed as a hollow screw having a thread at one end, said one end of the housing having one of the two openings and the opposite end being closed by a closure element.

8. A starting valve according to claim 7 wherein the piston is movable between the two ends of the housing and wherein movement of the piston in the direction of the threaded end causes movement into the open position.

9. A starting valve according to claim 1 wherein said spring element is disposed in a chamber with ambient pressure between the housing and the piston.

10. A starting valve according to claim 9 wherein said spring element is disposed in a chamber with ambient pressure between the housing and the piston.

11. A starting valve according to claim 1 including adjusting means cooperative with the means for maintaining a low flow of pressure medium in order to alter the rate of flow of the low pressure medium.

12. A starting valve according to claim 1 wherein the means for maintaining a low flow of pressure medium are formed by an end region of the piston and the valve seat, a throttle opening being formed between the end region of the piston and the valve seat.

13. A starting valve according to claim 11 wherein the adjusting means at that end of the piston opposite the valve seat is engageable with the said end.

14. A starting valve according to claim 11 wherein the adjusting means form a stop for the piston in the closed position.

15. A starting valve according to claim 11 wherein the adjusting means are formed by an adjusting screw.

16. A starting valve according to claim 11 wherein the piston is movable relative to the adjusting means.

17. A starting valve according to claim 1 wherein between the housing and the piston a seal is provided on that end of the piston remote from the valve seat, the diameter of the piston at the position of the seal being greater than the diameter of the piston in the region of the valve seat.

18. A starting valve according to claim 5 wherein between the housing and the piston a seal is provided on that end of the piston remote from the valve seat, the diameter of the piston at the position of the seal being greater than the diameter of the piston in the region of the valve seat.

* * * * *